United States Patent [19]
Sugita et al.

[11] Patent Number: 5,708,870
[45] Date of Patent: Jan. 13, 1998

[54] OPTICAL APPARATUS

[75] Inventors: Jun Sugita, Kawasaki; Naoya Kaneda, Chigasaki; Mitsuo Niida, Yokohama, all of Japan

[73] Assignee: Canon Kabushiki Kaisha, Tokyo, Japan

[21] Appl. No.: 188,591

[22] Filed: Jan. 28, 1994

Related U.S. Application Data

[63] Continuation of Ser. No. 791,869, Nov. 13, 1991, abandoned.

[30] Foreign Application Priority Data

Nov. 19, 1990 [JP] Japan ................................. 2-313691

[51] Int. Cl.⁶ ................................................... G03B 1/18
[52] U.S. Cl. .................... 396/87; 396/100; 396/133
[58] Field of Search .......................... 354/195.1, 195.11, 354/195.12, 226, 227.1, 230, 236, 238.1, 242, 261; 391/400, 402, 465; 359/698; 396/85, 87, 88, 90, 100, 33

[56] References Cited

U.S. PATENT DOCUMENTS

| | | | |
|---|---|---|---|
| 4,588,276 | 5/1986 | Kaise | 354/274.1 |
| 4,597,657 | 7/1986 | Wakabayashi | 354/195.12 |
| 4,716,432 | 12/1987 | Stephany | 354/446 |
| 4,951,075 | 8/1990 | Tokumaru et al. | 354/400 |
| 4,975,724 | 12/1990 | Hirasawa et al. | 354/400 |
| 4,994,834 | 2/1991 | Watabe et al. | 354/234.1 |
| 5,027,147 | 6/1991 | Kaneda | 354/400 |
| 5,028,773 | 7/1991 | Hata | 354/201.5 |

*Primary Examiner*—Safet Metjahic
*Assistant Examiner*—Nicholas J. Tuccillo
*Attorney, Agent, or Firm*—Robin, Blecker, Daley and Driscoll

[57] ABSTRACT

An optical apparatus comprises a zoom lens for effecting magnification change, a focusing lens for effecting focus adjustment, a first motor for moving the focusing lens, a second motor for moving the zoom lens, and detecting mechanism for detecting the reference positions of the focusing lens and the zoom lens, the detecting mechanism being used in common to the two lenses.

39 Claims, 3 Drawing Sheets

OPTICAL APPARATUS

This is a continuation application under 37 CFR 1.62 of prior application Ser. No. 791,869, filed Nov. 13, 1991 now abandoned.

BACKGROUND OF THE INVENTION

1. Field of the Invention

This invention relates to an optical apparatus having a zoom lens for magnification change and a focusing lens for focus adjustment and having a motor for driving the two lens units.

2. Related Background Art

As a zoom lens barrel for a still camera or a zoom lens barrel for a video camera, there is known one of the type in which a focusing lens in the lens barrel is driven by a stepping motor.

Generally, to drive a moving object by a stepping motor, the so-called open loop control system is often adopted as a control system for the movement and positioning of the object. It is for the reason that in the case of the open loop control system, a detecting device for detecting the position of the moving object at every moment is unnecessary and the construction of the control system is simple and compact as compared with the control system of a closed loop control system. However, when effecting the positioning control of a moving object by an open loop control system using a stepping motor, it is necessary to return the moving object to a particular reference position before the starting of the positioning control in order to make the driving start position of the stepping motor and the driving start position of the moving object coincident with each other, and accordingly, reference position (reset position) detecting means for detecting whether the moving object has been positioned at the reference position (reset position) becomes necessary.

In a conventional zoom lens, only a focusing lens has been positioning-controlled by open loop control by stepping motor driving, while a zoom lens has been positioning-controlled by closed loop control using no stepping motor. The reason is that an attempt to effect the movement and positioning of the zoom lens by the open loop control using a stepping motor gives rise to the problem that the aforementioned reference position (reset position) detecting means becomes newly necessary for the zoom lens, but if another reference position detecting means is disposed in the narrow lens barrel, the lens barrel will become bulky or the design for preventing the lens barrel from becoming bulky becomes complicated. However, controlling the zoom lens unit by the open loop control system by a stepping motor has not only the utility that the movement of the zoom lens unit becomes digitally controllable, but also the utility that the simplification of the control system for the zoom lens unit and the compactness of the zoom lens barrel are made possible, and accordingly, it has been necessary to solve the above-noted problem.

SUMMARY OF THE INVENTION

One aspect of the invention is an optical apparatus characterized by the provision of a motor for driving a focusing lens, a motor for driving a zoom lens, and a common reference position detecting means for detecting the positions of the focusing lens and the zoom lens, respectively, and the necessity of providing discrete reference detecting positions for the respective lenses is eliminated, thus achieving the compactness of the optical apparatus.

One aspect of the invention is an optical apparatus characterized by the provision of a motor for driving a focusing lens and a motor for driving a zoom lens and in that the detections of the positions of the focusing lens and the zoom lens, respectively, are set so as to be effected substantially at the same location, and the detections of the reference positions of the respective lenses can be effected substantially at the same location, thus achieving the compactness of the optical apparatus.

DETAILED DESCRIPTION OF THE PREFERRED EMBODIMENTS

Some embodiments of the present invention will hereinafter be described with reference to FIGS. 1 and 3. The embodiments which will hereinafter be described are those in a case where the present invention is applied to a zoom lens barrel for a camera, but as a matter of course, the present invention is also applicable to an optical apparatus for observation, etc.

Figure 1:
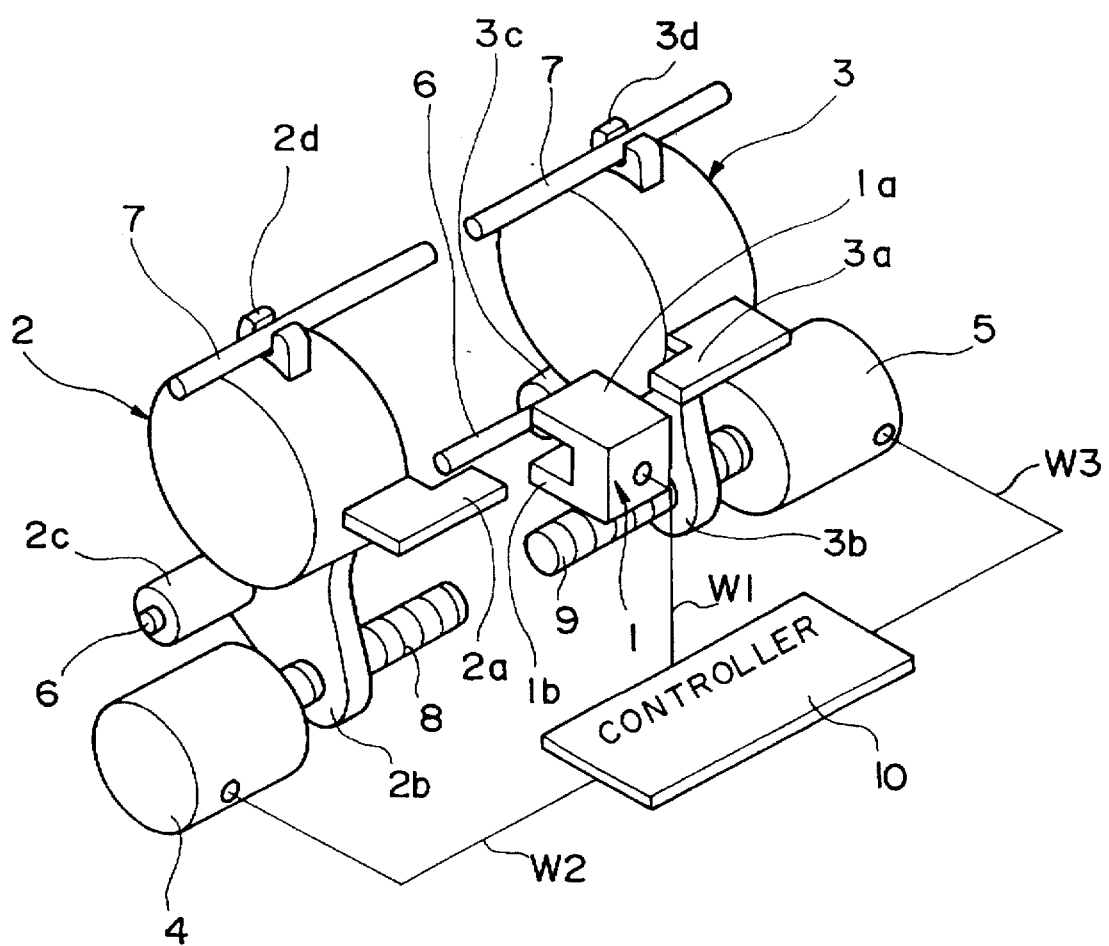
FIG. 1 is a schematic view showing the structure of the essential portions of an optical apparatus such as a zoom lens barrel constructed in accordance with the present invention.

FIG. 1 is a schematic view of the essential portions of a zoom lens barrel according to a first embodiment of the present invention. In FIG. 1, the reference numeral 1 designates a reset switch as reference position (reset position) detecting means fixed to a stationary member, not shown. As shown, this reset switch 1 has a U-shaped body, and the upper horizontal piece portion 1a (hereinafter referred to as the top plate portion) and the lower horizontal piece portion 1b (hereinafter referred to as the bottom plate portion) of the body are disposed parallel to the optical axis of an optical system which will be described later, and a plate to be detected which is protruded from a lens holder which will be described later is designed to be capable of coming into the space between the top plate portion 1a and the bottom plate portion 1b. A light projecting element is attached to the underside of the top plate portion 1a and a light receiving element is attached to the upper surface of the bottom plate portion 1b in opposed relationship with the light projecting element. The light receiving element and the light projecting element together constitute a photointerrupter, and the light receiving element is electrically connected to a controller 10 on an electronic circuit substrate through an electric wire w1. The controller 10 performs all the electrical controls of a plurality of counters, a motor driving circuit, etc.

The reference numeral 2 denotes a focusing lens holder carrying a focusing lens unit thereon. On the outer periphery of the holder 2, there are projectedly provided a feed screw engaging piece (or a female helicoid member) 2b provided with a threaded hole threadably engaged with a feed screw 8, a sleeve-shaped sliding portion 2c axially slidably fitted to a first guide bar 6, a projection piece 2d with a U-shaped groove axially slidably fitted to a second guide bar 7, and a plate to be detected 2a capable of coming into the space between the top plate portion 1a and the bottom plate portion 1b of the reset switch 1.

The feed screw 8 extends parallel to the optical axis of the lens and is fixed to the shaft of the stepping motor 4 for driving a focusing lens.

The first guide bar 6 and the second guide bar 7 extend parallel to the optical axis of the lens and are fixed to a stationary member, not shown.

The reference numeral 3 designates a zoom lens holder carrying a zoom lens unit thereon and disposed coaxially with and at a predetermined interval from the focusing lens holder 2. On the outer periphery of the zoom lens holder 3, there are projectedly provided a feed screw engaging piece (or a female helicoid member) 3b having a threaded hole threadably engaged with a feed screw 9, a sleeve-shaped sliding portion 3c axially slidably fitted to the first guide bar 6, a projection piece 3d with a U-shaped groove axially slidably fitted to the second guide bar 7, and a plate to be detected 3a capable of coming into the space between the top plate portion 1a and the bottom plate portion 1b of the reset switch 1.

The feed screw 9 extends parallel to the optical axis of the lens and is fixed to the shaft of a stepping motor 5 for driving a zoom lens. The stepping motor 4 is connected to the controller 10 by a wire w2, and the stepping motor 5 is connected to the controller 10 by a wire w3.

Figure 2:
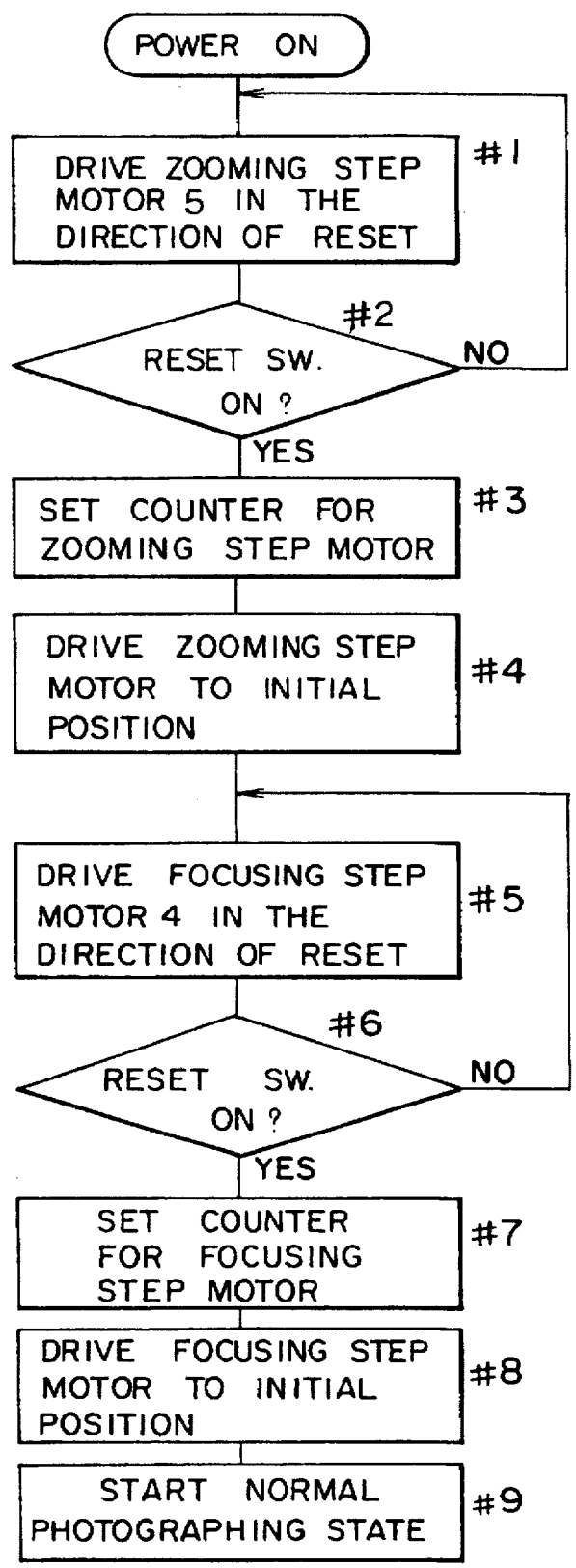
FIG. 2 is a flow chart of a control operation executed in the controller of the optical apparatus shown in FIG. 1.

The operation when the lens barrel of the present embodiment having the structure as described above is mounted on a camera and photographing is effected by the camera will now be described with reference to FIGS. 1 and 2. FIG. 2 is a flow chart of the control operation executed in the controller 10 at that time.

When a power source switch, not shown, is closed, the motor 5 begins to rotate and the feed screw 9 is rotated, whereby the zoom lens holder 3 is moved along the feed screw 9 toward the fore-end of the screw 9 (step 1). When the plate to be detected 3a comes into the space between the top plate portion 1a and the bottom plate portion 1b of the reset switch 1, the light beam from the light projecting element of the photo-reflector is intercepted by the plate to be detected 3a and therefore, the switch 1 becomes ON (step 2) and resets the zooming counter of the controller 10 (step 3). Further, the motor 5 is driven in a predetermined direction. In response to this, the zooming counter of the controller 10 drives the motor 5 while counting the step number (the driving pulse number for driving the motor 5), thereby moving the zoom lens holder 3 to its initial set position (step 4). The motor 4 is then rotated and the focusing lens holder 2 is moved toward the fore end of the feed screw 8 (step 5). When the plate to be detected 2a comes into the space between the top plate portion 1a and the bottom plate portion 1b of the reset switch 1 and intercepts the light from the light projecting element, the switch 1 becomes ON (step 6) and resets the focusing counter of the controller 10 (step 7). Further, the motor 4 is driven in a predetermined direction. In response to this, the zooming counter of the controller 10 drives the motor 4 while counting the step number (the driving pulse number for driving the motor 4), thereby moving the focusing lens holder 2 to its initial set position (step 8). Thereafter, normal photographing becomes possible (step 9).

As described above, in the present embodiment, the detections of the reset positions of the zoom lens and focusing lens can be accomplished by a reset switch common to the two lenses and therefore, without the apparatus being made bulky, the open loop control system of stepping motor driving can also be adopted for zoom lens control.

Figure 3:
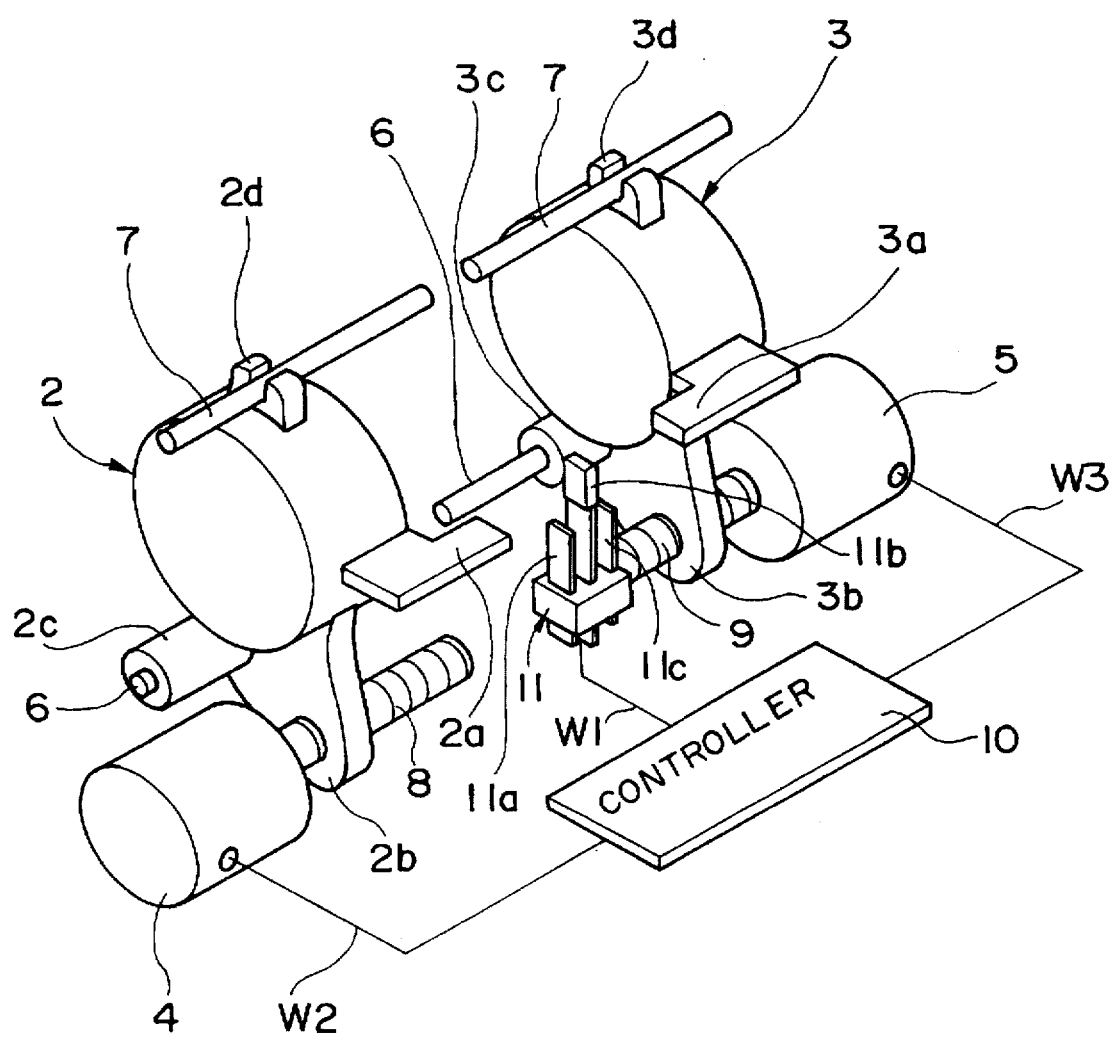
FIG. 3 shows a partly modified embodiment of the optical apparatus shown in FIG. 1.

FIG. 3 shows a second embodiment of the present invention. This embodiment differs from the first embodiment in adopting a three-contact type leaf switch, instead of the photosensor as previously described, as the reset switch. Accordingly, in FIG. 3, portions similar in construction to those in the first embodiment are given similar reference characters and need not be described.

In FIG. 3, the reference numeral 11 designates a leaf switch having three contact pieces 11a–11c and electrically connected as the result switch to the controller 10 through a wire w1.

The plate to be detected 2a projectedly provided on the focusing lens holder 2 and the plate to be detected 3a projectedly provided on the zoom lens holder 3 are adapted to strike against the contact piece 11b of the leaf switch 11.

The operation of a photographing apparatus having the construction of FIG. 3 will now be described with reference to FIGS. 2 and 3.

When a power source switch, not shown, is closed, the motor 5 begins to rotate and the feed screw 9 is rotated, whereby the zoom lens holder 3 is moved along the feed screw 9 toward the fore-end of the screw 9 (step 1). When the plate to be detected 3a pushes the contact piece 11b of the leaf switch 11 and the contact piece 11b comes into contact with the contact piece 11a, the switch 11 becomes ON (step 2) and resets the zooming counter of the controller 10 (step 3). Further, the motor 5 is driven in a predetermined direction. In response to this, the zooming counter of the controller 10 drives the motor 5 while counting the step number (the driving pulse number for driving the motor), thereby moving the zoom lens holder 3 to its initial set position (step 4). The motor 4 is then rotated and the focusing lens holder 2 is moved toward the fore-end of the feed screw 8 (step 5). When the plate to be detected 2a pushes the contact piece 11b of the leaf switch 11 and the contact piece 11b comes into contact with the contact piece 11c, the switch 11 becomes ON (step 6) and resets the focusing counter of the controller 10 (step 7). Further, the motor 4 is driven in a predetermined direction. In response to this, the zooming counter of the controller 10 drives the motor 4 while counting the step number (the driving pulse number for driving the motor 4), thereby moving the focusing lens holder 2 to its initial set position (step 8). Thereafter, normal photographing becomes possible (step 9).

As described above, in the present embodiment, the detections of the reset positions of the zoom lens and focusing lens can be accomplished by a reset switch common to the two lenses and therefore, without the apparatus being made bulky, the open loop control system of stepping motor driving can also be adopted for zoom lens control.

As described above, in the above-described embodiments, design is made such that the initial set positions of the focusing lens unit and zoom lens unit can be detected by a reset switch and therefore, without the lens barrel being made bulky, the open loop control system can be adopted as the driving control system for the zoom lens unit and thus, according to the present invention, there can be provided an optical apparatus which is more compact and lower in manufacturing cost than the prior-art optical apparatus. Also, the detections of the initial set positions of the focusing lens unit and zoom lens unit are set so as to be effected substantially at the same location and therefore, without the lens barrel being made bulky, it has become possible to adopt the open loop control system as the driving control system for the zoom lens unit.

The foregoing embodiments have been described with respect to an optical apparatus in which the zoom lens is positioned on the more rearward side of the optical axis than the focusing lens, but a similar effect can also be obtained in an optical apparatus wherein the focusing lens is positioned on the more rearward side of the optical axis than the zoom lens, and this is covered by the scope of the present invention.

What is claimed is:

1. An optical apparatus comprising:
   a zoom lens for effecting magnification change;
   a focusing lens for effecting at least focus adjustment;
   a first motor for moving said focusing lens;
   a second motor for moving said zoom lens; and
   a single detecting means for detecting reference positions of both said focusing lens and said zoom lens, said detecting means being used in common with both said focusing lens and said zoom lens.

2. An optical apparatus according to claim 1, wherein a stepping motor is used as at least one of said first and second motors.

3. An optical apparatus according to claim 2, further comprising first control means for imparting a driving pulse to said stepping motor to thereby forcibly move said lens until said reference positions are detected by said detecting means.

4. An optical apparatus according to claim 3, further comprising second control means for imparting a driving pulse to said stepping motor after said reference positions are detected by said detecting means, thereby moving said lens to its initial set position.

5. An optical apparatus according to claim 3, wherein said first control means starts the driving control of said stepping motor upon closing of a power source switch.

6. An optical apparatus according to claim 4, wherein the movement of said lens to its initial set position by said second control means is continuously controlled after the detection of said reference positions by said first control means.

7. An optical apparatus according to claim 6, wherein both of said first motor and said second motor are stepping motors, and after the control by said first control means and the control by said second control means are continuously effected for one of said two lenses, the control by said first control means and the control by said second control means are continuously effected for the other lens.

8. An optical apparatus according to claim 1, wherein said detecting means is positioned substantially between said two lenses.

9. An optical apparatus according to claim 1, wherein said two lenses are held by respective lens holding members, and respective feed screws are rotated by the outputs of said first and second motors to thereby move said holding members in the direction of the optical axis, thereby moving said two lenses.

10. An optical apparatus according to claim 1, wherein said two lenses are held by respective lens holding members each having a plate to be detected protruded from a body, and by respective ones of said plates to be detected arriving at a detecting position in said detecting means, said detecting means detects the arrival of said lenses at said reference positions.

11. An optical apparatus according to claim 10, wherein said two plates to be detected are moved so as to have the same locus in said detecting position wherein at least the detection by said detecting means is effected so that said plates to be detected may be detected by said detecting means.

12. An optical apparatus according to claim 1, wherein said detecting means includes optical detecting means having a light projecting element and a light receiving element.

13. An optical apparatus according to claim 1, wherein said detecting means includes a leaf switch.

14. An optical apparatus comprising:
   a zoom lens for effecting magnification change;
   a focusing lens for effecting at least focus adjustment;
   a first motor for moving said focusing lens;
   a second motor for moving said zoom lens; and
   detecting means having at least one output line providing a signal indicative of detection thereby, said output line providing signals separately indicative of reference positions of both said focusing lens and said zoom lens.

15. A movement control apparatus comprising:
   a single detection switch which converts moving states of a first movable member and also a second movable member which moves independently from said first movable member into signals, said single detection switch performing an operation for converting the moving state of the first movable member into the signal and an operation for converting the moving state of the second movable member into the signal, to perform with different timing from each other; and
   a control device which controls the movement of said first and second movable members on the basis of the signal detected by said single detection switch.

16. An apparatus according to claim 15, wherein said single detection switch includes means for determining the state of said first movable member and for determining the state of said second movable member time serially.

17. An apparatus according to claim 15, wherein said first and second movable members are possible to individually and respectively move.

18. An apparatus according to claim 15, wherein the apparatus includes means for being provided to an optical equipment.

19. An apparatus according to claim 15 wherein the apparatus includes means for being provided to an apparatus which comprises at least one of the first and second movable members.

20. An apparatus according to claim 15, wherein said control device includes means for controlling the movement of said first movable member on the basis of a signal corresponding to a moving state of said first movable member detected by said single detection switch.

21. An apparatus according to claim 20, wherein said control device includes means for controlling the movement of said second movable member on the basis of a signal corresponding to a moving state of said second movable member detected by said single detection switch.

22. An apparatus according to claim 15, wherein said single detection switch includes means for detecting that said second movable member is positioned at a predetermined reference position and said control device includes means for controlling a deviation of said second movable member from said reference position on the basis of thus obtained result of said single detection switch.

23. An apparatus according to claim 22, wherein said control device includes means for controlling the deviation of said second movable member from the reference position on the basis of a predetermined signal which is different from the signal output by said single detection switch.

24. An apparatus according to claim 22, wherein said control device includes means for controlling the deviation of said second movable member from the reference position on the basis of a predetermined pulsed signals.

25. An apparatus according to claim 15, wherein said single detection switch includes means for determining each of positions of said first and second movable members.

26. An apparatus according to claim 25, wherein said single detection switch includes means for determining whether said first and second movable members locate at a predetermined position.

27. An apparatus according to claim 26, wherein said single detection switch includes means for determining whether said first and second movable members locate at a reference position respectively, the reference positions at where each of movement controls of said first and second movable members are performed.

28. An apparatus according to claim 15, wherein said single detection switch includes means for detecting that said first movable member is positioned at a predetermined reference position and said control device includes means for controlling a deviation of the first movable member from said reference position on the basis of thus obtained result of said single detection switch.

29. An apparatus according to claim 28, wherein said control device includes means for controlling the deviation of said first movable member from the reference position on the basis of a predetermined signal which is different from the signal output by said single detection switch.

30. An apparatus according to claim 28, wherein said control device includes means for controlling the deviation of said first movable member from the reference position on the basis of predetermined pulsed signals.

31. An apparatus according to claim 15 wherein said control device comprises:

first movement control means for performing a movement control of said first movable member; and second movement control means for performing a movement control of said second movable member.

32. An apparatus according to claim 31 further comprising:

first driving means for moving said first movable member in accordance with an output of said first movement control means; and second driving means for moving said second movable member in accordance with an output of said second movement control means.

33. An apparatus according to claim 31, wherein said single detection switch includes means for determining whether said first and second movable members locate at a predetermined position, and said first and second movement control means respectively include means for performing the movement controls of said first and second movable members at the predetermined position as a reference position.

34. An apparatus according to claim 33, wherein said first and second movement control means include means for moving said first and second movable members with a desired amount of movement from a state in which said first and second movable members are located at the predetermined position.

35. A position detection apparatus comprising:

a single detection switch which converts positions of a first movable member and also a second movable member which moves independently of said first movable member into signals, said single detection switch performing an operation for converting the position of the first movable member into the signal and an operation for converting the position of the second movable member into the signal, to perform with different timing from each other; and a control device which controls the movement of said first and second movable members on the basis of the signal detected by said single detection switch.

36. A position detection apparatus comprising:

a single detection switch which converts positions of a first movable member and also a second movable member which moves independently of the first movable member into signals and for outputting the signals, said single detection switch performing an operation for converting the position of the first movable member into the signal and an operation for converting the position of the second movable member into the signal, to perform with different timing from each other; and a control device which controls the movement of said first and second movable members on the basis of the signal detected by said single detection switch.

37. An optical apparatus comprising:

a single detection switch which converts moving states of a first movable member and also a second movable member which moves independently of said first member into signals, said single detection switch performing an operation for converting the moving state of the first movable member into the signal and an operation for converting the moving state of the second movable member into the signal, to perform with different timing from each other; and a control device which controls the movement of said first and second movable members on the basis of the signal detected by said single detection switch.

38. An optical apparatus comprising:

a single detection switch which converts positions of a first movable member and also a second movable member which moves independently of said first member into signals, said single detection switch performing an operation for converting the position of the first movable member into the signal and an operation for converting the position of the second movable member into the signal, to perform with different timing from each other; and a control device which controls the movement of said first and second movable members on the basis of the signal detected by said single detection switch.

39. An optical apparatus comprising:

a single detection switch which converts positions of a first movable member and also a second movable member which moves independently of said first member into signals and for outputting the signals, said single detection switch performing an operation for converting the position of the first movable member into the signal and an operation for converting the position of the second movable member into the signal, to perform with different timing from each other; and a control device which controls the movement of said first and second movable members on the basis of the signal detected by said single detection switch.

* * * * *

UNITED STATES PATENT AND TRADEMARK OFFICE
CERTIFICATE OF CORRECTION

PATENT NO.   : 5,708,870
DATED        : Jan. 13, 1998
INVENTOR(S)  : Sugita et al.

It is certified that error appears in the above-identified patent and that said Letters Patent is hereby corrected as shown below:

Col. 3, line 45, delete "fore end" and insert --fore-end--.

Signed and Sealed this

Twenty-sixth Day of May, 1998

Attest:

BRUCE LEHMAN

Attesting Officer    Commissioner of Patents and Trademarks